United States Patent
Gautrot et al.

(10) Patent No.: US 11,506,113 B2
(45) Date of Patent: Nov. 22, 2022

(54) GAS INTAKE DEVICE COMPRISING AN ORIENTED MASKING ELEMENT

(71) Applicant: IFP Energies nouvelles, Rueil-Malmaison (FR)

(72) Inventors: Xavier Gautrot, Rueil-Malmaison (FR); Julien Trost, Rueil-Malmaison (FR); Martin Ritter, Rueil-Malmaison (FR); Arnaud Krieger, Rueil-Malmaison (FR); Paul-Georgian Luca, Rueil-Malmaison (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 0 days.

(21) Appl. No.: 17/440,297

(22) PCT Filed: Mar. 27, 2020

(86) PCT No.: PCT/EP2020/058714
§ 371 (c)(1),
(2) Date: Sep. 17, 2021

(87) PCT Pub. No.: WO2020/212117
PCT Pub. Date: Oct. 22, 2020

(65) Prior Publication Data
US 2022/0154630 A1 May 19, 2022

(30) Foreign Application Priority Data
Apr. 16, 2019 (FR) ...................................... 1904025

(51) Int. Cl.
*F02B 31/08* (2006.01)
*F02F 1/42* (2006.01)
(Continued)

(52) U.S. Cl.
CPC ............ *F02B 31/085* (2013.01); *F02B 31/04* (2013.01); *F02F 1/4235* (2013.01);
(Continued)

(58) Field of Classification Search
None
See application file for complete search history.

(56) References Cited

U.S. PATENT DOCUMENTS 5,056,486 A * 10/1991 Johannes ............... F02F 1/4214
123/308
6,606,975 B1 * 8/2003 Caliskan ................. F02B 31/06
123/590
(Continued)

FOREIGN PATENT DOCUMENTS

DE 10128500 C1 2/2003
DE 202014007837 U1 2/2016
(Continued)

*Primary Examiner* — Kevin R Steckbauer
(74) *Attorney, Agent, or Firm* — Fitch, Even, Tabin & Flannery LLP

(57) ABSTRACT

The present invention relates to a gas inlet device (1) for a cylinder of an internal combustion engine. The gas inlet device (1) comprises an inlet port (5), an inlet valve (4), a calibration (6) of the inlet valve (4), means for forming a tumble-type aerodynamic movement of the gas in the cylinder, and a mask (10). Furthermore, the intersection (7) between the inlet port (5) and the calibration (6) is along a straight line not parallel to the plane of the firing face (FF). In addition, the mask (10) is oriented in the same way as the end of the inlet port (5).

17 Claims, 8 Drawing Sheets

(51) Int. Cl.
*F02M 35/10* (2006.01)
*F02B 31/04* (2006.01)
F02B 23/10 (2006.01)
F02B 31/00 (2006.01)

(52) U.S. Cl.
CPC . *F02M 35/10124* (2013.01); *F02B 2023/103* (2013.01); *F02B 2023/106* (2013.01); *F02B 2023/108* (2013.01); *F02B 2031/006* (2013.01)

(56) References Cited

U.S. PATENT DOCUMENTS

| | | | |
|---|---|---|---|
| 10,690,084 B2 * | 6/2020 | Mori | F02P 5/145 |
| 10,774,777 B2 * | 9/2020 | Mori | F02D 41/0072 |
| 2008/0149063 A1 * | 6/2008 | Denger | F02B 23/104 |
| | | | 123/193.6 |
| 2012/0160198 A1 * | 6/2012 | Durando | F02B 17/005 |
| | | | 123/90.16 |
| 2016/0208732 A1 * | 7/2016 | Mori | F02P 5/145 |
| 2018/0320629 A1 * | 11/2018 | Mori | F02B 31/06 |

FOREIGN PATENT DOCUMENTS

| | | | |
|---|---|---|---|
| EP | 0537745 A1 | 4/1993 | |
| EP | 1783341 A1 | 5/2007 | |
| FR | 2898643 A1 | 9/2007 | |
| FR | 2924165 A3 * | 5/2009 | B22C 9/10 |
| FR | 2924165 A3 | 5/2009 | |
| JP | 2007-162517 A | 6/2007 | |
| JP | 2010-261314 A | 11/2010 | |
| WO | 2015/033205 A1 | 3/2015 | |
| WO | WO-2015033205 A1 * | 3/2015 | F02B 23/08 |

* cited by examiner

ART ANTERIEUR

ART ANTERIEUR

ART ANTERIEUR

GAS INTAKE DEVICE COMPRISING AN ORIENTED MASKING ELEMENT

CROSS-REFERENCE TO RELATED APPLICATIONS

This application is a U.S. national phase application filed under 35 U.S.C. § 371 of International Application No. PCT/EP2020/058714, filed Mar. 27, 2020, designating the United States, which claims priority from French Patent Application No. 19/04.025 filed Apr. 16, 2019, which are hereby incorporated herein by reference in their entirety for all purposes.

TECHNICAL FIELD

The present invention relates to the field of gas inlet devices for an internal combustion engine. The present invention relates in particular to gas inlet devices capable of generating an aerodynamic movement of gases in the cylinder of the engine.

This type of engine generally comprises at least one cylinder, a piston sliding in this cylinder in a reciprocating rectilinear movement, means for admitting an oxidant, means for exhausting burnt gases, a combustion chamber, and injection means for injecting a fuel.

As is generally acknowledged, when designing an engine, the constraints regarding performance and pollutant emissions are becoming increasingly strict and it is therefore necessary to find novel solutions for increasing the final efficiency of the engine.

Increasing the efficiency of the combustion is therefore a key factor in limiting pollutant emissions for the same or better performance. To do that, it is of the utmost importance that all of the fuel present in the combustion chamber is used by an oxidant comprising for example air at ambient pressure, supercharged air, or a mixture of air (supercharged or otherwise) and of recirculated burnt gases.

Specifically, it is necessary for the carbureted mixture (oxidant/fuel) in the combustion chamber to be as homogeneous as possible.

In addition, in order to ensure good efficiency as well as a good rate of combustion, it is desirable to have a high level of turbulence, and more specifically a high level of turbulent kinetic energy, at the moment of ignition of the carbureted mixture and during the course of the combustion that follows.

This high level of turbulence can be achieved by using specific inlet aerodynamics: swumble. This type of aerodynamics is characterized in that the macroscopic movement of the carbureted mixture is a compound of swirl (a rotary movement of the gases in the cylinder about a vertical cylinder axis) and of tumble (a rotary movement of the gases in the cylinder along a longitudinal engine axis).

Swirl, which is a macroscopic movement of rotation of the carbureted mixture about an axis collinear with the axis of the cylinder, is characterized in that it is maintained well during the course of the inlet process and more specifically during the piston upstroke. This is a macroscopic aerodynamic movement which is generally used for compression-ignition internal combustion engines where there is a good way of homogenizing the carbureted mixture.

Tumble is likewise a macroscopic rotational movement of the carbureted mixture, but about an axis that is, overall, perpendicular to the axis of the cylinder. It has the particular feature of transforming into microscopic aerodynamic movements which create turbulence during the piston upstroke. This is a macroscopic aerodynamic movement which is generally used for controlled-ignition internal combustion engines where there is a good way of obtaining a suitable rate of combustion. Furthermore, this movement is fairly sensitive to the geometry of the combustion chamber and also to the valve-lift law both in terms of its spread and in terms of the maximum height of valve lift.

Using swumble provides the benefit of the advantages of both of the aerodynamic structures detailed hereinabove, and therefore provides the benefit of excellent homogenization and of a better rate of combustion thanks to a higher level of turbulence during the compression phase than is observed with the best current controlled-ignition engines.

PRIOR ART

Various technical solutions have been developed for achieving these turbulent flows in the cylinder.

A first solution is described notably in U.S. Pat. No. 6,606,975. This solution consists in controlling a flap positioned in the inlet port to generate turbulence. That patent also features the notion of swumble at light load. Such a solution is complex and detrimental to the filling of the cylinder.

A second solution is described notably in U.S. Pat. No. 5,056,486. That solution proposes a definition of asymmetric inlet ports capable of generating complex aerodynamics. However, that solution requires a phase-shifting of the openings of the inlet valves, and proves detrimental at high load.

A third solution is described notably in patent applications DE10128500 and EP1783341. That solution allows complex aerodynamics to be generated using passive or active appendages in the inlet port. In both instances, these appendages limit the filling of the cylinder with gas. In addition, the active appendages require control, making the solution complex.

A fourth solution is described notably in patent applications US 2008/0149063, JP 2010-261314 and US 2012160198. That solution consists in generating aerodynamic movements of the gas in the cylinder using masks positioned at the end of the inlet port. However, in order to obtain a swumble-type aerodynamic movement of the gas, it would appear necessary to use two masks per inlet port, or to use special valve-lift laws, making this solution complex. In addition, the masks used limit the filling of the cylinder with gas.

SUMMARY OF THE INVENTION

It is an object of the invention to overcome these disadvantages, by means of an inlet device able, in a simple way, to obtain good engine performance, notably with significant turbulent energy and a stable swumble-type aerodynamic structure of the gas. In order to do that, the present invention relates to a gas inlet device for a cylinder of an internal combustion engine. The gas inlet device comprises an inlet port, an inlet valve, a valve seat of the inlet valve, means for forming a tumble-type aerodynamic movement of the gas within the cylinder, and a mask. Furthermore, the intersection between the inlet port and the valve seat is along a straight line not parallel to the plane of the firing face. This inclination allows the generation of an aerodynamic movement of the swirl type in the cylinder, which combines with the tumble to form an aerodynamic movement of the swumble type. In addition, the mask is oriented in the same way as the end of the inlet port, encouraging the aerodynamic movement of the gas in the cylinder.

The invention relates to a gas inlet device for a cylinder of an internal combustion engine, said gas inlet device comprising an inlet port, at least one inlet valve positioned within said inlet port, at least one valve seat of said inlet valve positioned at one end of said inlet port and facing toward the firing face of said cylinder, means for deflecting said gas to generate an aerodynamic movement of said gas within said cylinder about an axis substantially perpendicular to the axis of said cylinder, at least one mask partially obstructing said end of said inlet port opening into said cylinder, wherein, on the intrados of said inlet port, the intersection between said inlet port and said valve seat forms a straight-line segment supported by a rectilinear generatrix forming an angle $\alpha$ of between 5 and 45° with respect to a plane parallel to said firing face of said cylinder and passing through a point of intersection between said inlet port and said valve seat. A midplane of said mask forms an angle $\gamma$ about the axis of said valve with respect to the midplane of said inlet port, such that $\gamma=\alpha+/-5°$.

According to one embodiment, the angle $\gamma$ is defined by $\gamma=\alpha+/-2°$, and preferably the angle $\gamma$ is substantially equal to the angle $\alpha$.

According to one implementation, said angle $\alpha$ is between 5 and 20°, and preferably between 8 and 15°.

According to one aspect, said means for generating an aerodynamic movement of the gas within said cylinder about an axis substantially perpendicular to the axis of said cylinder consist of the shape of said inlet port, notably by means of a half-pipe shape and/or of a convergence of the bore section of said inlet port, and/or an inclination of said inlet port.

According to one feature, said inlet port comprises two gas outlets leading to said cylinder and two inlet valves.

According to one option, said mask has substantially the shape of a portion of an annulus of which the centre is positioned on the axis of said inlet valve.

Advantageously, said annulus portion extends over an angular range $\delta$ of between 150 and 200°, preferably between 160 and 180°, and preferentially substantially 170°.

Advantageously, the height of said mask is between 2 and 4 mm, preferably between 2.8 and 3.2 mm, and is preferentially substantially equal to 3 mm.

As a preference, the fillet radius connecting said mask to said cylinder is between 1 and 3 mm, and is preferentially substantially equal to 2 mm.

Furthermore, the invention relates to an internal combustion engine comprising at least one cylinder provided with at least one inlet device according to one of the preceding features, with at least one exhaust device, and with fuel-injection means.

Other features and advantages of the device according to the invention will become apparent on reading the description below of non-limiting embodiments, with reference to the appended figures described below.

LIST OF THE FIGURES

DESCRIPTION OF THE EMBODIMENTS

Figure 1:
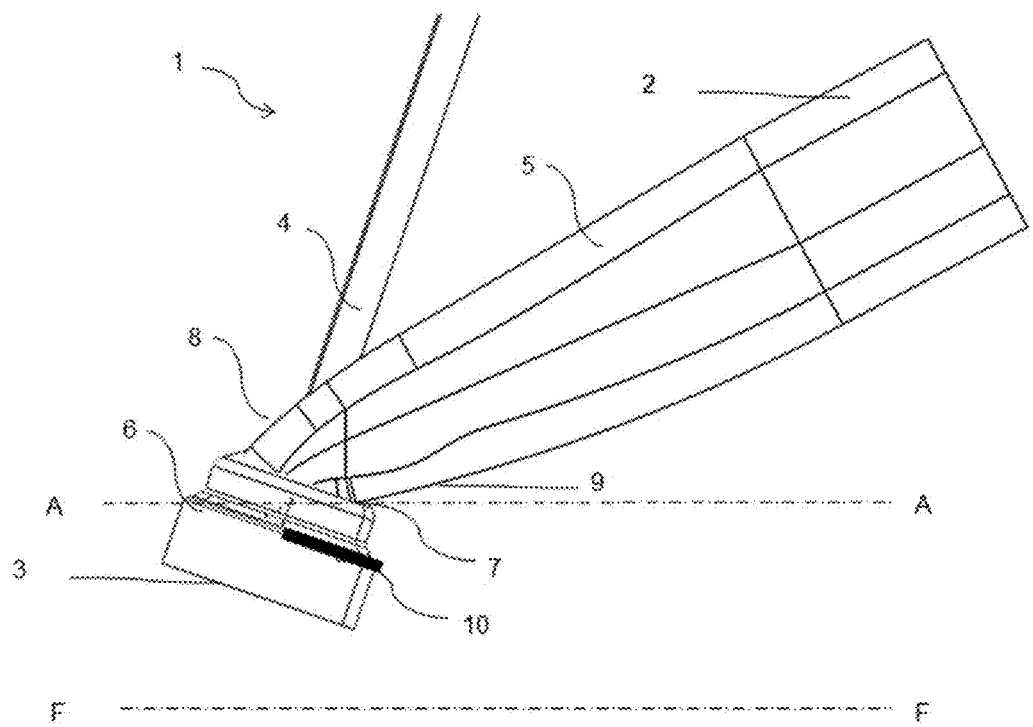
FIG. 1 illustrates an inlet device according to one embodiment of the invention, in its operational position.

The present invention relates to a gas inlet device for a cylinder of an internal combustion engine.

The gas inlet device comprises:
- a gas inlet port for admitting a gas into a cylinder,
- an inlet valve inserted in the inlet port, the opening of the valve allowing the gas to enter the cylinder,
- an inlet-valve valve seat piece positioned at the cylinder end of the inlet valve, the valve seat facing toward the firing face of the cylinder, the valve seat of the inlet valve being a substantially cylindrical mechanical component within which the valve moves,
- means for deflecting the gas to generate an aerodynamic movement of the gas within the cylinder in a direction perpendicular to the axis of the cylinder, in other words means for forming a tumble-type aerodynamic movement of the gas,
- an inlet mask partially blocking off the end of the inlet port which opens into the cylinder. A specific machining in the combustion chamber near the site of the inlet valve seats and which is able to block the bore over part of the bore section of the inlet port at the seat in order to accelerate the gases and therefore increase the turbulence in the combustion chamber is defined as an inlet mask.

The lower plane of the cylinder head (of the internal combustion engine) orthogonal to the axis of the cylinder is referred to as the firing face or combustion face. The valve seat of the valve is inserted into the lower plane of the cylinder head so as to supply the cylinder with gas.

According to the invention, the inlet device is formed in such a way that, on the intrados of said inlet port, the intersection between the inlet port and the valve seat of the valve forms a straight-line segment supported by a rectilinear generatrix forming an angle $\alpha$ of between 5 and 45° with respect to a plane parallel to the firing face and passing through a point of intersection between the inlet port and the valve seat of the valve. The lower face of the inlet port (when the inlet port is in its operational position) is referred to as the intrados of the inlet port. Thus, the intersection (which is a straight-line segment) of the lower face of the inlet port with the valve seat is inclined with respect to a plane parallel to the firing face. This inclination allows the gas entering the valve seat and, especially, entering the cylinder to be deflected. This deflecting of the gas forms an aerodynamic movement of the gas within the cylinder in a direction parallel to the axis of the cylinder, in other words a swirl-type aerodynamic movement of the gas. This inclination may translate to a rotation of the inlet port at its end (the end of the inlet port is therefore twisted), which encourages the swirl-type aerodynamic movement of the gas. In addition, this embodiment allows a swirl-type aerodynamic movement to be imparted to the gas without any special appendage of the mask, flap or blade type. In addition, the architecture of these inlet devices imposes no additional constraint regarding installing it in a cylinder head of a single-cylinder or multi-cylinder internal combustion engine.

The inclination at an angle $\alpha$ of between 5 and 45° allows the generation of a swirl-type aerodynamic movement of the gas. Below 5°, the inclination is not sufficient to have a significant influence on the aerodynamic movement of the gas in the cylinder. Above 45°, the geometry of the inlet port is complex and difficult to achieve.

By combining tumble-type and swirl-type aerodynamic movements of the gas, the gas inlet device according to the invention allows a swumble-type aerodynamic movement of the gas in the cylinder, providing the benefits of excellent homogenization and a better rate of combustion thanks to a higher level of turbulence during the compression phase than is observed with the best current controlled-ignition engines.

According to one aspect of the invention, the bore section of the inlet port may have a shape that is substantially rectangular, with rounded corners. In that case, the intersection of the inlet port and the valve seat of the valve is formed by four edge corners: one on the intrados, one on the extrados, and two on the lateral sides.

According to one example of this embodiment, the rectangular bore section of the inlet port at the intersection with the valve seat is inclined with respect to the direction of the firing face. In other words, none of the edge corners of the rectangular bore section is parallel or perpendicular to a plane parallel to the firing face.

According to the invention, a midplane of the mask forms a non-zero angle $\gamma$ about the axis of the valve with respect to the midplane of the inlet port, such that the angle $\gamma$ can be defined by the relationship: $\gamma=\alpha+/-5°$. In the present application, $X+/-Y$ (where X and Y are positive numbers) means a range centred on the value X, which range is between the values X−Y and X+Y (including endpoints). Thus, the mask is oriented in a similar way to the end of the inlet port, thus encouraging the aerodynamic movement of the gas in the cylinder. This approach results in gains in turbulent kinetic energy in the vicinity of top dead centre, and the stability of the structure of the aerodynamic movement of the gas in the cylinder is improved in comparison with a mask-free inlet device provided with means for generating swumble-type aerodynamic movement of the gas. In addition, this arrangement imposes no additional constraint regarding installing it in a cylinder head of the engine, making it possible in a simple way to obtain an aerodynamic movement of the gas in the cylinder. A plane which sections the mask into two identical parts and which contains the axis of the inlet valve is referred to as a midplane of the mask. The midplane of the mask may be its plane of symmetry. A plane which sections the inlet port into two substantially identical parts and which contains the axis of the inlet valve is referred to as a midplane of the inlet port.

According to one implementation of the invention, the angle $\gamma$ can be defined by $\gamma=\alpha+/-2°$. As a preference, the angle $\gamma$ may be substantially equal to the angle $\alpha$. These preferred values allow optimization of the gains in turbulent kinetic energy and in stability of the aerodynamic movement of the gas, thanks to greater similarity between the orientation of the mask and the orientation of the end of the inlet port.

The gas is an oxidant or a carbureted mixture (in the case of indirect injection), and may notably comprise air at ambient pressure, supercharged air, a mixture of air (supercharged or otherwise) and of burnt gases.

According to one embodiment of the invention, the angle $\alpha$ may be between 5 and 20°, and preferably between 8 and 15°. These angular ranges allow optimization of the swirl-type aerodynamic movement of the gas, and thus optimization of the swumble-type combined aerodynamic movements of the gas.

According to one implementation of the invention, the gas-deflecting means consist solely of the shape of the inlet port. Thus, there is no active or passive element to impede the passage of the gas through the inlet port.

According to a first exemplary embodiment, the gas-deflecting means may comprise a half-pipe shape on the lower profile of the inlet port. This half-pipe shape may be obtained by varying the concavity of the lower profile of the inlet port. The half-pipe shape encourages separation of the flow of gas from the walls of the inlet port and directs the flow toward the upper part of the inlet port and therefore toward the upper part of the cylinder so as to maximize the tumble-type aerodynamic movement of the gas.

According to a second exemplary embodiment (which may be combined with the first exemplary embodiment), the gas-deflecting means may comprise a convergence of the bore section in the vicinity of the valve seat of the valve. In other words, the bore section of the inlet port decreases toward its end closest to the valve seat of the valve. This convergence causes an acceleration of the gas flow which is beneficial for the filling with and aerodynamic movement of the gas.

According to a third exemplary embodiment (which may be combined with the first and/or second exemplary embodiment), the gas-deflecting means may comprise an inclination of the inlet port. This inclination of the inlet port may be defined by an angle of the tangent to the point of intersection of the inlet port with the valve seat of between 0 and 45°. This inclination may be coupled to the gradient of the upper part of the combustion chamber of the cylinder. The inclination of the inlet port enables the flow of gas entering the cylinder to be inclined in order to form a tumble-type aerodynamic movement of the gas. For example, optimization of the tumble-type aerodynamic movement of the gas may be achieved by tangency between the angle of the inlet port and the angle of the gradient of the upper part of the combustion chamber.

According to one embodiment of the invention, the mask may have substantially the shape of a portion of an annulus of which the centre is situated on the axis of the inlet valve. This shape provides a compromise between the filling of the cylinder and the aerodynamic movement of the gas in the cylinder. By masking part of the bore section of the inlet port for low inlet-valve valve lift, the aerodynamic movement of the gas in the cylinder is initiated without excessively penalizing the filling, because the valve lift is low. Once the inlet-valve valve lift is greater, the mask is no longer operative and there is therefore maximum filling with an already-initiated aerodynamic movement of the gas in the cylinder which can then develop. Advantageously, the inside diameter of the annulus may correspond substantially to the diameter of the valve seat of the valve. Advantageously, the annulus portion may extend over an angular range of between 150 and 200°, preferably between 160 and 180°, and may preferentially be equal to 170°. These angular ranges allow the aerodynamic movement of the gas leaving the inlet port to be oriented so as to optimize the aerodynamic movement of the gas in the cylinder.

According to one embodiment option of the invention, the height of the mask may be between 2 and 4 mm, preferably between 2.8 and 3.2 mm, and may preferentially be substantially equal to 3 mm. These ranges of values allow a good compromise for initiating the aerodynamic movement of the gas in the cylinder without penalizing the filling of the cylinder.

Advantageously, the fillet radius connecting the mask to the roof of the cylinder may be between 1 and 3 mm, and may be substantially equal to 2 mm. This then avoids isolated zones in the combustion chamber (cylinder). In addition, angular shapes would be disadvantageous to combustion in the cylinder.

According to one aspect of the invention, the gas inlet device may be of siamese type. In other words, the inlet port has a single inlet and two outlets leading into the cylinder, each of the outlets comprising an inlet valve and an inlet valve seat. Each outlet has the angular features defined to form a swumble-type aerodynamic movement of the gas. This type of inlet device, suitable for cylinders provided with two inlet valves, simplifies the design of the intake plenum (the intake plenum is the volume upstream of the inlet ports). In addition, each outlet has a mask, oriented according to the features defined in the present application.

Figure 2:
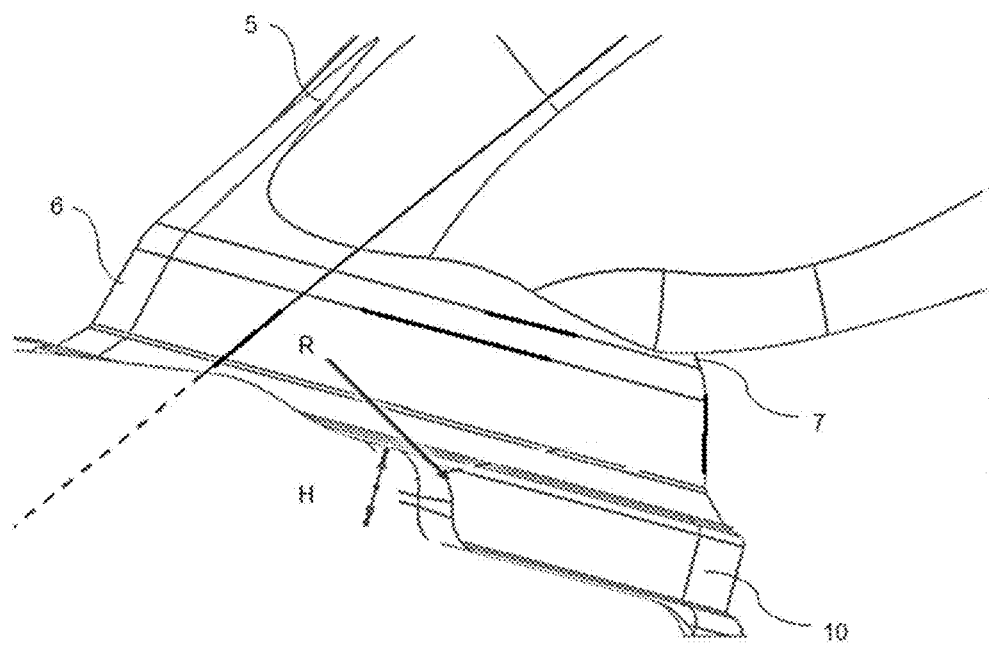
FIG. 2 illustrates a mask of an inlet device according to one embodiment of the invention, in its operational position.

FIGS. 1 and 2 illustrate, schematically and nonlimitingly, an inlet device 1 according to one embodiment of the invention. FIG. 1 is a side view, ready for operation, of the inlet device 1, and FIG. 2 is an enlargement of FIG. 1 in the region of the mask. The inlet device 1 comprises an inlet port 5, a valve 4 introduced into the inlet port, and an inlet valve seat 6. The end of the inlet valve 4 that provides passage for the gas in order to open said valve is not depicted. The inlet port 5 comprises a gas inlet 2 and a gas outlet 3 in which the inlet valve 4 and the valve seat 6 thereof are located.

The inlet device 1 further comprises means for deflecting the gas to generate an aerodynamic movement of the gas within the cylinder in a direction perpendicular to the axis of the cylinder (tumble-type aerodynamic movement of the gas). These gas-deflecting means comprise a convergence 8 of the bore section of the inlet port 5 in the vicinity of the valve seat 6 of the valve. This convergence 8 corresponds to a reduction in the bore section in the vicinity of the valve seat 6. In addition, the gas-deflecting means comprise a half-pipe 9 formed on the lower profile of the inlet port 5 by a variation in the concavity of the lower profile of the inlet port 5. Furthermore, the gas-deflecting means comprise the inclination of the inlet port 5 which is defined by the tangent to the point of intersection 7 of the inlet port 5 with the valve seat 6, and with respect to a direction AA. This figure features a straight line FF belonging to the plane of the firing face, and the direction AA is parallel to the straight line FF.

Furthermore, the inlet device 1 comprises a mask 10. The mask 10 is placed in the valve seat 6 to partially obstruct the outlet 3 of the inlet port 5. The mask 10 is defined by a height H and by a radius of curvature R with respect to the roof of the chamber of the cylinder. For the embodiment illustrated, the height H may be equal to 3 mm and the connecting fillet radius R may be equal to 2 mm.

Figure 3:
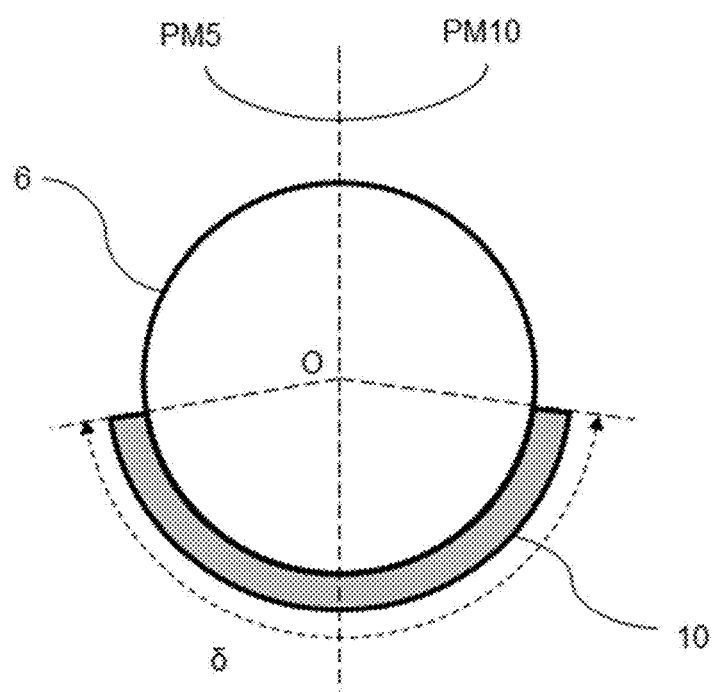
FIG. 3 illustrates the orientation of a mask of an inlet device according to the prior art, on a plane perpendicular to the axis of the valve.

FIG. 3 schematically illustrates the orientation of a mask of an inlet device according to the prior art, on a plane perpendicular to the axis of the valve. The mask 10 has the shape of an annulus portion. The mask 10 is positioned in the valve seat 6 (just one wall of which is depicted). The outside diameter of the mask 10 corresponds to the diameter of the valve seat 6. The annulus portion of the mask 10 has a centre O (the centre O is situated on the axis of the valve) and extends over an angular range δ, which may be substantially equal to 170°. In addition, the mask 10 has a midplane PM10 (indicated by a straight line). The midplane PM10 of the mask 10 is the plane of symmetry of the mask which contains the axis of the valve. This figure also depicts the midplane of the inlet port PM5 (indicated by a straight line). For the embodiment of the prior art, the midplanes PM5 and PM10 are coincident.

Figure 4:
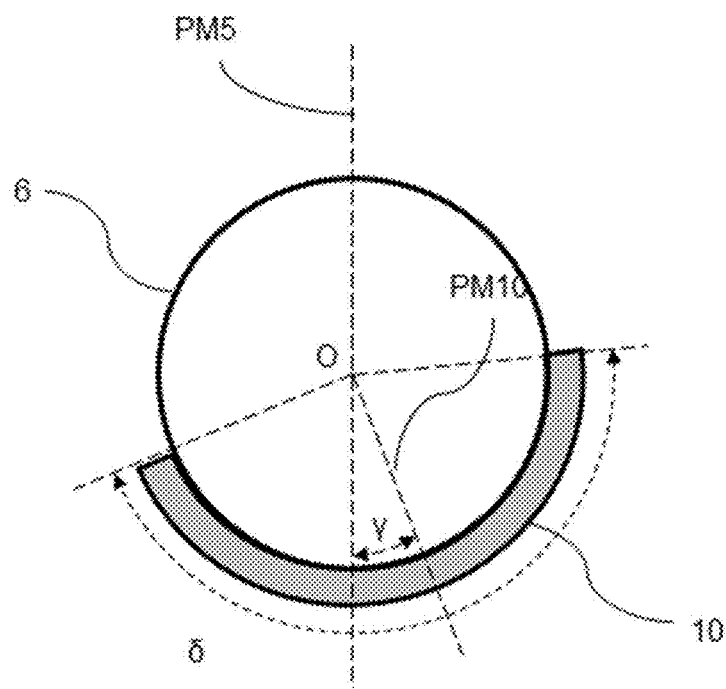
FIG. 4 illustrates the orientation of a mask of an inlet device according to one embodiment of the invention, on a plane perpendicular to the axis of the valve.

FIG. 4 schematically and nonlimitingly illustrates the orientation of a mask of an inlet device according to one embodiment of the invention, on a plane perpendicular to the axis of the valve. The mask 10 has the shape of an annulus portion. The mask 10 is positioned in the valve seat 6 (just one wall of which is depicted). The outside diameter of the mask 10 corresponds to the diameter of the valve seat 6. The annulus portion of the mask 10 has a centre O (the centre O is situated on the axis of the valve) and extends over an angular range δ, which may be substantially equal to 170°. In addition, the mask 10 has a midplane PM10 (indicated by a straight line). The midplane PM10 of the mask 10 is the plane of symmetry of the mask which contains the axis of the valve. This figure also depicts the midplane of the inlet port PM5 (indicated by a straight line). According to the invention, the midplanes PM5 and PM10 are not coincident: the midplane PM10 is obtained by rotation of the midplane PM5 about the axis of the valve by an angle γ.

Figure 5:
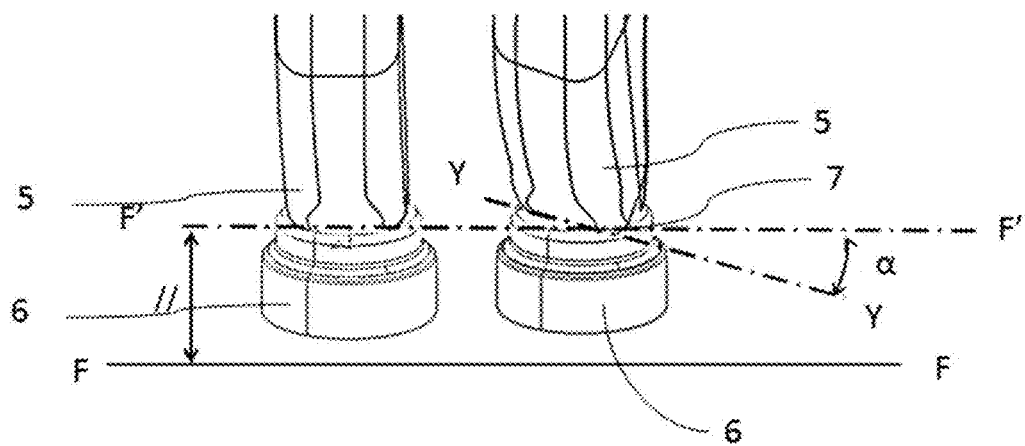
FIG. 5 illustrates views of the intrados of a gas inlet device according to the prior art and according to one embodiment of the invention, respectively, in its operational position.

FIG. 5 schematically and nonlimitingly illustrates partial views of the intrados (lower face) of inlet ports. FIG. 5 is in a plane perpendicular to the firing face (when the inlet device is in the operational position). The figure on the left corresponds to a port according to the prior art with no means for deflecting the gas to form a swirl-type aerodynamic movement of the gas. The figure on the right corresponds to a device according to a variant of the invention with, on the intrados, an inclination of the intersection between the inlet port and the valve seat to form a swirl-type aerodynamic movement of the gas. For the embodiment illustrated, the cross section of the port (inlet port) is substantially rectangular.

In these figures, the straight line FF belongs to the plane of the firing face (which face is defined by the cylinder which has not been depicted), and the direction F'F' is a straight line belonging to a plane parallel to the firing face FF passing through a point of intersection between the inlet port 5 and the valve seat 6 of the inlet valve.

According to the prior art illustrated in the figure on the left, the intersection 7 between the inlet port 5 and the valve seat 6 of the inlet valve is a straight-line segment coincident with the straight line F'F'.

By contrast, according to the invention illustrated in the figure on the right, the intersection 7 between the inlet port 5 and the valve seat 6 of the inlet valve forms a straight-line segment supported by a rectilinear generatrix of axis YY inclined by an angle α with respect to the plane F'F'. This angle α is between 5 and 45°. It may be seen in the figure on the right that this inclination leads, in the vicinity of the connecting fillet, to a slight rotation of the inlet port 5, which has a substantially rectangular bore section. According to the invention, the angle α is connected to the angle γ illustrated in FIG. 4, by the formula: γ=α+/−5°.

The invention also relates to an assembly comprising a cylinder of an internal combustion engine and an inlet device according to one of the variants or combinations of variants described hereinabove.

In addition, the present invention relates to an internal combustion engine comprising at least one cylinder, each cylinder being provided:
- with at least one inlet device according to one of the variants or combinations of variants described hereinabove, for admitting a gas into the cylinder,
- with at least one exhaust device, for removing the burnt gases from the cylinder, the exhaust device advantageously being equipped with an exhaust valve,
- with a piston having a reciprocating rectilinear translational movement in the cylinder in order to generate mechanical energy from the combustion (through the rotation of a crankshaft),
- with fuel-injection means, to generate combustion.

According to one embodiment, the fuel-injection means may be direct-injection means, which means to say that the fuel-injection means are positioned directly in the cylinder.

Alternatively, the fuel-injection means may be indirect-injection means, which means to say that the fuel-injection means are positioned in the inlet device.

According to one implementation of the invention, the internal combustion engine is a controlled-ignition engine. In that case, the engine also comprises at least one spark plug to initiate combustion of the mixture of gas and fuel.

Alternatively, the internal combustion engine is a compression-ignition engine. In that case, the engine does not comprise any spark plug to initiate combustion of the mixture of gas and fuel.

The internal combustion engine may comprise a plurality of cylinders, notably 3, 4, 5 or 6 cylinders.

As a preference, the combustion engine may be an engine that has four valves per cylinder (two inlet valves and two exhaust valves).

According to one aspect of the invention, when the cylinders comprise two inlet ports, these two ports may be identical and parallel with respect to the midplane of the combustion chamber.

As a variant, the cylinders may be supplied with gas by a Siamese inlet device.

Furthermore, the present invention relates to the use of an internal combustion engine according to one of the variants or combinations of variants described hereinabove, operating on a Miller cycle or on an Atkinson cycle.

The Miller cycle is a thermodynamic cycle characterized by closure of the inlet valve or valves before the piston reaches bottom dead centre during the induction stroke. That allows greater amounts of work to be recovered, as well as allowing cooling of the admitted charge. The inlet device according to the invention is particularly suited to use in the so-called Miller cycle over an extended range of operation thanks to the generation of a swumble-type aerodynamic movement of the gas.

The Atkinson cycle is the standard thermodynamic cycle used in variable combustion engines.

The internal combustion engine according to the invention, which can be used in the field of mobile applications, such as the fields of road, maritime or aeronautical transport, or in the field of static installations, such as an electricity generator set.

It goes without saying that the invention is not limited to just these embodiments of the inlet device which have been described above by way of example, but rather encompasses all variants.

EXAMPLES

The features and advantages of the method according to the invention will become more clearly apparent on reading the following comparative example.

In this comparative example, a comparison is made between two inlet devices with identical means for generating a swumble-type aerodynamic movement and with masks in the shape of an annulus portion extending over an angular portion of 170°. In the first inlet device compared, the mask is oriented in accordance with the prior art (FIG. 3). In the second inlet device compared, the mask is oriented according to one embodiment of the invention (FIG. 4) with α=15° and γ=15°.

Figure 6:
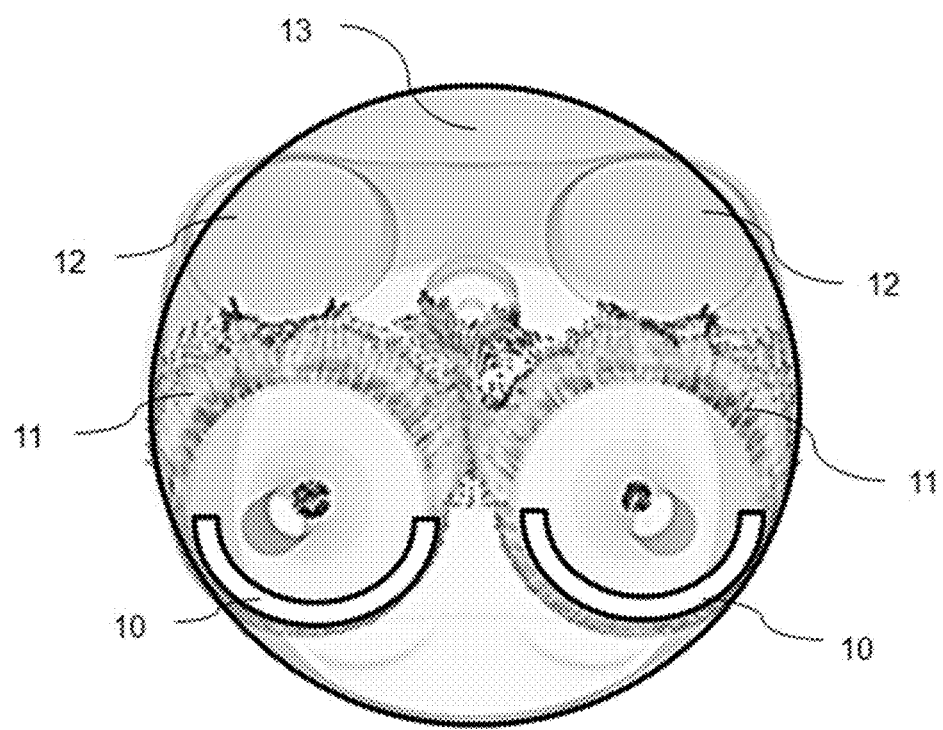
FIG. 6 illustrates the aerodynamic movement of the gas leaving the inlet valve for an inlet device equipped with a mask according to the prior art, for a crankshaft angle of 460°.
Figure 7:
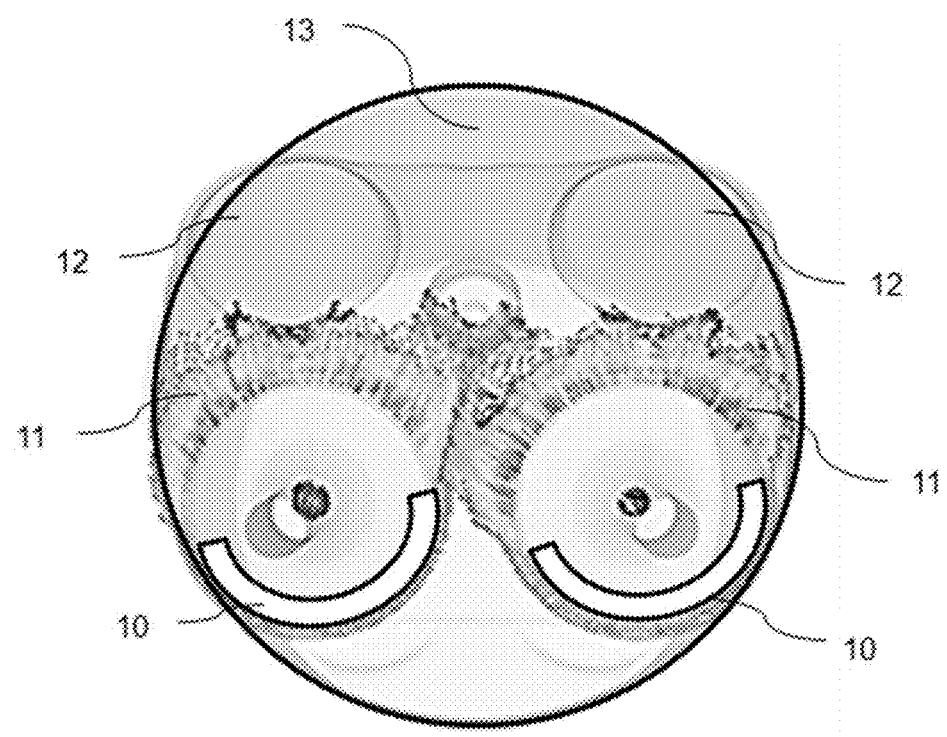
FIG. 7 illustrates the aerodynamic movement of the gas leaving the inlet valve for an inlet device equipped with a mask according to one embodiment of the invention, for a crankshaft angle of 460°.

FIGS. 6 and 7 are views from above (in the operational position) of a cylinder 13 equipped with two inlet ports each provided with a mask 10 and with two exhaust ports 12. FIGS. 6 and 7 illustrate the aerodynamic movement of the gas 11 for a crankshaft angle of 460°, corresponding to the start of the induction stroke. FIG. 6 corresponds to the setup according to the prior art, and FIG. 7 corresponds to the setup according to one embodiment of the invention. A different orientation of the aerodynamic movement of the gas may be noticed in these figures: the invention allows better orientation of the flow to generate a swumble-type aerodynamic movement of the gas in the cylinder.

Figure 8:
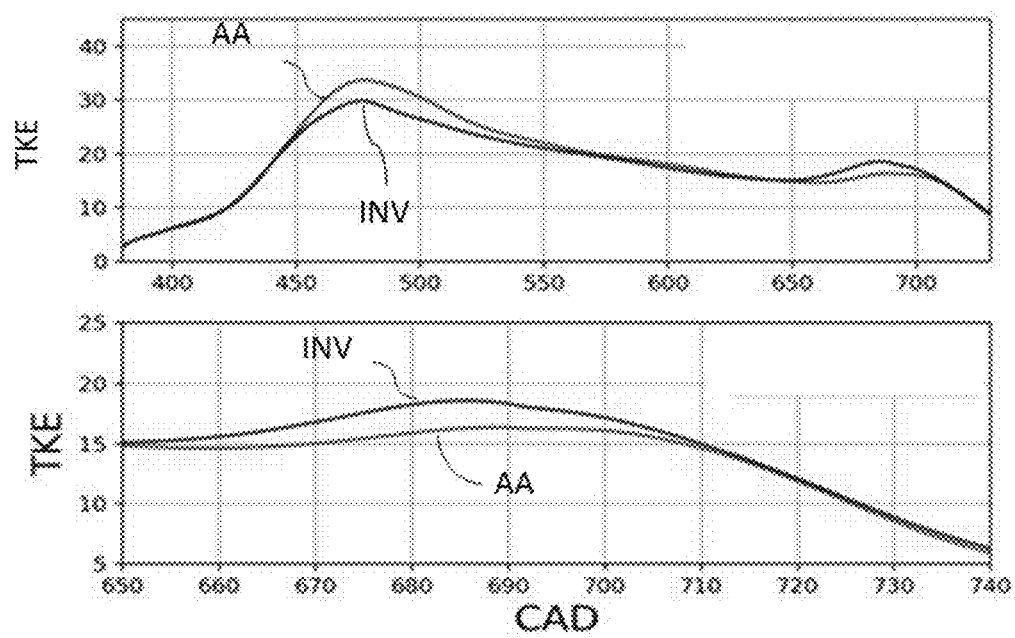
FIG. 8 illustrates two curves of the turbulent kinetic energy as a function of CAD (Crank Angle Degrees), one for an inlet port according to the invention and the other for an inlet port according to the prior art.

FIG. 8 depicts the turbulent kinetic energy TKE for each type of inlet, as a function of CAD (Crank Angle Degrees). The curve relating to the orientation of the mask according to the prior art is labelled AA, and the curve relating to the orientation of the mask according to one embodiment of the invention is labelled INV. The figure at the bottom is a zoomed-in version of the top figure for a CAD range ranging between 650 and 740. It will be noted that gains in turbulent kinetic energy near to top dead centre are obtained with the mask orientation according to the invention. This gain is of the order of 10% near top dead centre.

Figure 9:
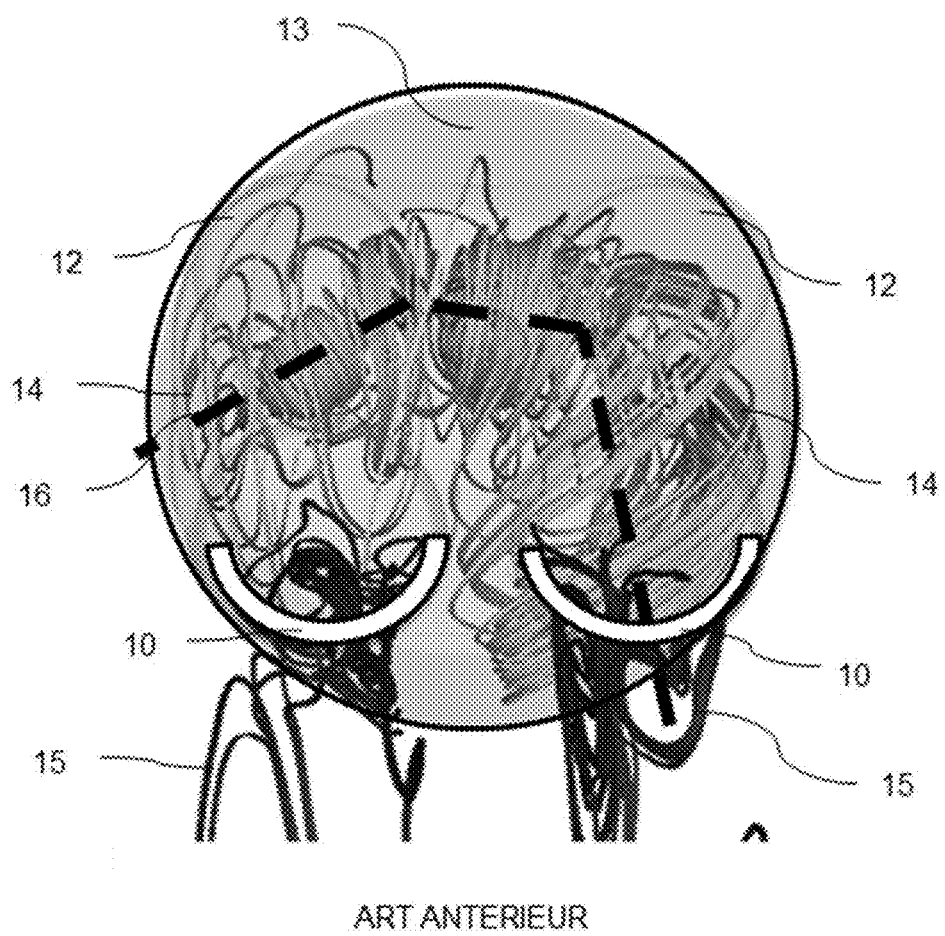
FIG. 9 illustrates the aerodynamic movement of the gas in the cylinder for an inlet device equipped with a mask according to the prior art, for a crankshaft angle of 590°.
Figure 10:
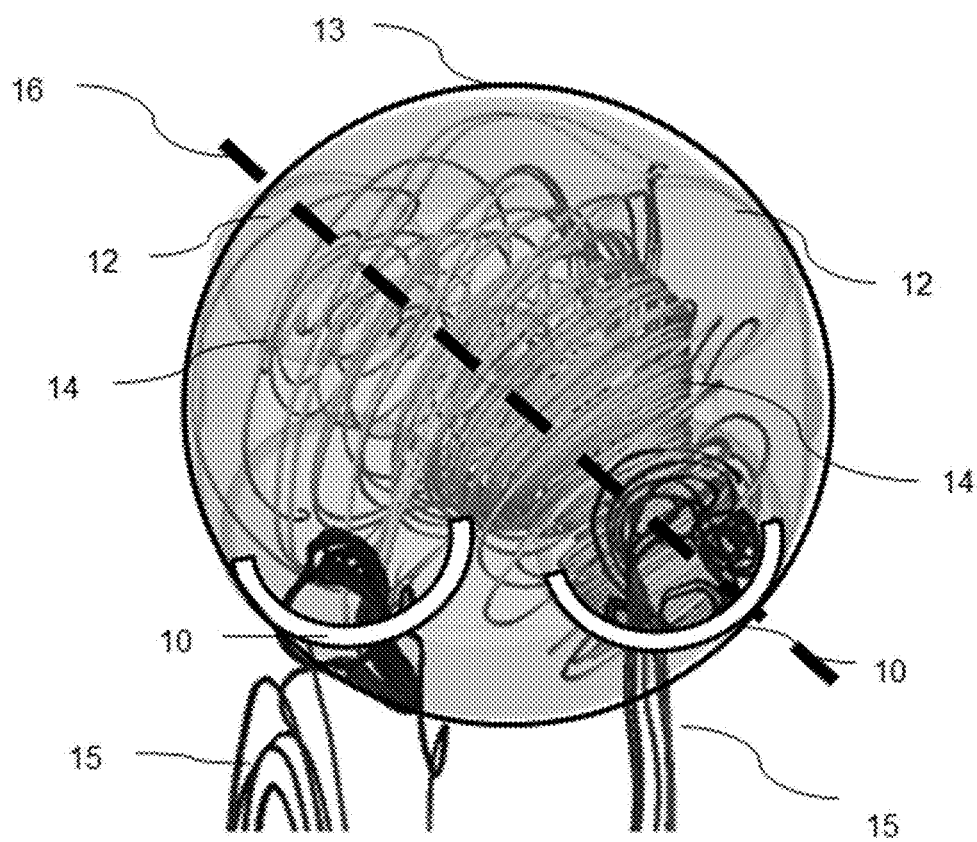
FIG. 10 illustrates the aerodynamic movement of the gas in the cylinder for an inlet device equipped with a mask according to one embodiment of the invention, for a crankshaft angle of 590°.

FIGS. 9 and 10 are views from above (in the operational position) of a cylinder 13 equipped with two inlet ports each provided with a mask 10 and with two exhaust ports 12. FIGS. 9 and 10 illustrate the aerodynamic movement of the gas 14 in the cylinder 13 for a crankshaft angle of 590° (during the compression stroke, the piston approaching top dead centre prior to ignition), and the aerodynamic movement of the gas 15 in the inlet ports (which have not been depicted). FIG. 9 corresponds to the setup according to the prior art, and FIG. 10 corresponds to the setup according to one embodiment of the invention. It may be noted in FIG. 9 that the swumble-type aerodynamic movement of the gas 14 in the cylinder is performed about an axis 16, which is a broken line made up of three straight-line segments. By contrast, it may be noted in FIG. 10 that the swumble-type aerodynamic movement of the gas 14 in the cylinder is performed about an axis 16, which is made up of a single straight line. Thus, the orientation of the mask according to the invention allows stability of the structure of the swumble-type aerodynamic movement of the gas in the cylinder.

The invention claimed is:

1. A gas inlet device for a cylinder of an internal combustion engine, the gas inlet device comprising an inlet port, at least one inlet valve positioned within the inlet port, at least one valve seat of the inlet valve positioned at one end of the inlet port and facing toward the firing face of the cylinder, means for deflecting the gas to generate an aerodynamic movement of the gas within the cylinder about an axis perpendicular to an axis of the cylinder, at least one mask partially obstructing the end of the inlet port opening into the cylinder, wherein, on an intrados of the inlet port, the intrados of the inlet port being the lower face of the inlet port, an intersection between the inlet port and the valve seat forms a straight-line segment supported by a rectilinear generatrix forming an angle $\alpha$ of between 5 and 45° with respect to a plane parallel to the firing face of the cylinder and passing through a point of intersection between the inlet port and the valve seat, thereby forming a twist of the end of the inlet port, characterized in that a bore section of the inlet port has a rectangular shape with rounded corners, in that a midplane of the mask forms an angle $\gamma$ about an axis of the inlet valve with respect to a midplane of the inlet port, such that $\gamma=\alpha+/-5°$, the midplane of the mask being its plane of symmetry and the midplane of the inlet port being a plane sectioning the inlet port into two identical parts and containing the axis of the inlet valve.

2. The gas inlet device according to claim 1, wherein the angle $\gamma$ is defined by $\gamma=\alpha+/-2°$.

3. The gas inlet device according to claim 1, wherein the angle $\alpha$ is between 5 and 20°.

4. The gas inlet device according to claim 1, wherein the means for generating an aerodynamic movement of the gas within the cylinder about an axis perpendicular to the axis of the cylinder consist of the shape of the inlet port, by means of a half-pipe shape and/or of a convergence of the bore section of the inlet port, and/or an inclination of the inlet port.

5. The gas inlet device according to claim 1, wherein the inlet port comprises two gas outlets leading to the cylinder and two inlet valves.

6. The gas inlet device according to claim 1, wherein the mask has the shape of a portion of an annulus of which the centre (O) is positioned on the axis of the inlet valve.

7. The gas inlet device according to claim 6, wherein the annulus portion extends over an angular range $\delta$ of between 150 and 200°.

8. The gas inlet device according to claim 1, wherein a height of the mask is between 2 and 4 mm.

9. The gas inlet device according to claim 1, wherein a fillet radius connecting the mask to the cylinder is between 1 and 3 mm.

10. Internal combustion engine comprising at least one cylinder provided with at least one gas inlet device according to claim 1, with at least one exhaust device, and with fuel-injection means.

11. The gas inlet device according to claim 1, wherein the angle $\gamma$ is equal to the angle $\alpha$.

12. The gas inlet device according to claim 1, wherein the angle $\alpha$ is between 8 and 15°.

13. The gas inlet device according to claim 6, wherein the annulus portion extends over an angular range $\delta$ of between 160 and 180°.

14. The gas inlet device according to claim 6, wherein the annulus portion extends over an angular range $\delta$ of 170°.

15. The gas inlet device according to claim 1, wherein a height of the mask is between 2.8 and 3.2 mm.

16. The gas inlet device according to claim 1, wherein a height of the mask is equal to 3 mm.

17. The gas inlet device according to claim 1, wherein a fillet radius connecting the mask to the cylinder is equal to 2 mm.

* * * * *